United States Patent [19]

Cutler et al.

[11] 4,310,896

[45] Jan. 12, 1982

[54] METHOD OF INTERFACING REMOTE UNITS TO A CENTRAL MICROPROCESSOR

[75] Inventors: Scott E. Cutler; Charles W. Eichelberger, both of Schenectady, N.Y.; Michael A. Haase, Euclid, Ohio

[73] Assignee: General Electric Company, Schenectady, N.Y.

[21] Appl. No.: 93,683

[22] Filed: Nov. 13, 1979

[51] Int. Cl.³ .............................................. G06F 3/04
[52] U.S. Cl. ................................ 364/900; 340/825.62
[58] Field of Search ... 364/200 MS File, 900 MS File, 364/104, 400, 705; 340/167 R, 313, 349

[56] References Cited

U.S. PATENT DOCUMENTS

| | | | |
|---|---|---|---|
| 3,360,778 | 12/1967 | Farrell | 364/900 |
| 3,559,184 | 1/1971 | Rawlings et al. | 364/200 |
| 3,972,023 | 7/1976 | Bodner et al. | 364/200 |
| 3,978,451 | 8/1976 | Ito et al. | 340/167 R X |
| 4,092,492 | 5/1978 | Eachus | 340/167 R X |
| 4,101,969 | 7/1978 | Lawson et al. | 364/900 |

Primary Examiner—Gareth D. Shaw
Assistant Examiner—Thomas M. Heckler

Attorney, Agent, or Firm—Geoffrey H. Krauss; James C. Davis; Marvin Snyder

[57] ABSTRACT

A method for interfacing two remote electronic units uses four lines and a handshaking routine including the steps of: causing the first unit to simultaneously transmit a strobe signal on one of the four lines and a signal representing one bit of the information to be communicated on a second of the four lines, sending the two signals continuously until acknowledged by the second unit; causing the second unit, when it receives these signals, simultaneously to transmit a strobe signal on a third line and a data signal, which may or may not be the same as that on the second line, on the fourth line, the third and fourth signals being transmitted continuously until their receipt is acknowledged; terminating transmission of the first and second signals when the first unit receives the third and fourth signals; and terminating the transmission of the third and fourth signals when the second unit determines that the first and second signals are no longer being transmitted. This routine is used for transmission of each bit of information to be communicated. If desired, a fifth line may be provided to carry a signal by means of which the first unit can reset the second unit so that transmission of the communication can be reinitiated in the event of difficulties.

13 Claims, 6 Drawing Figures

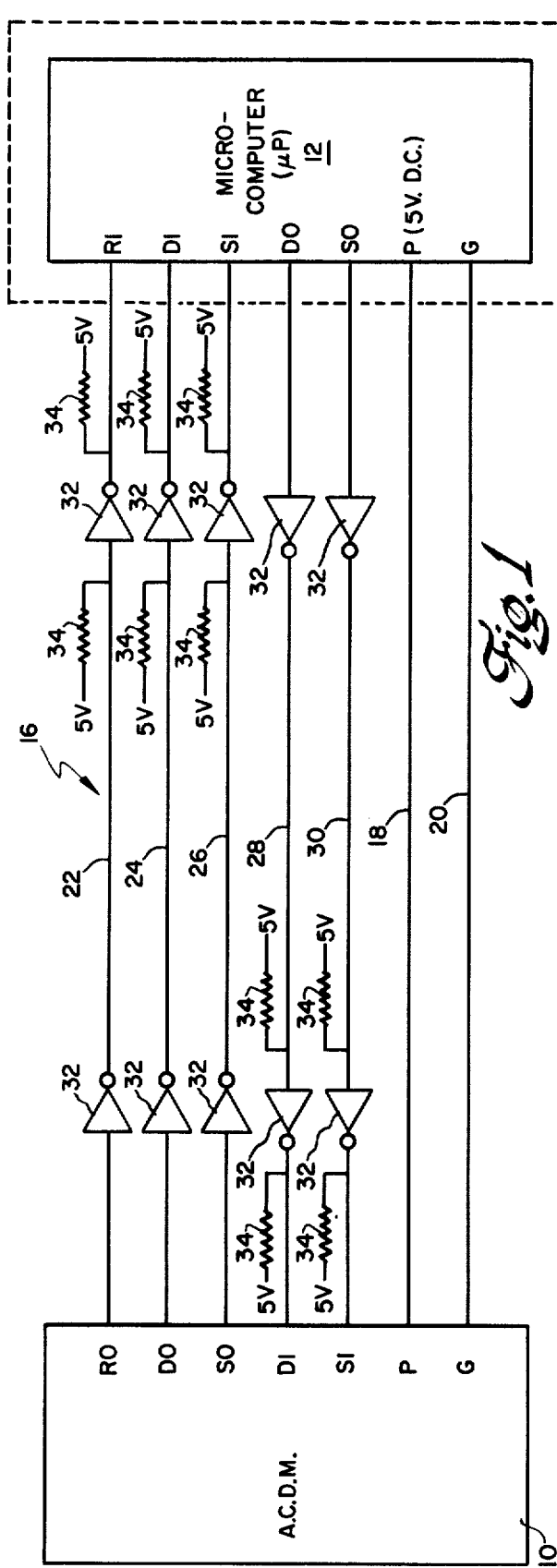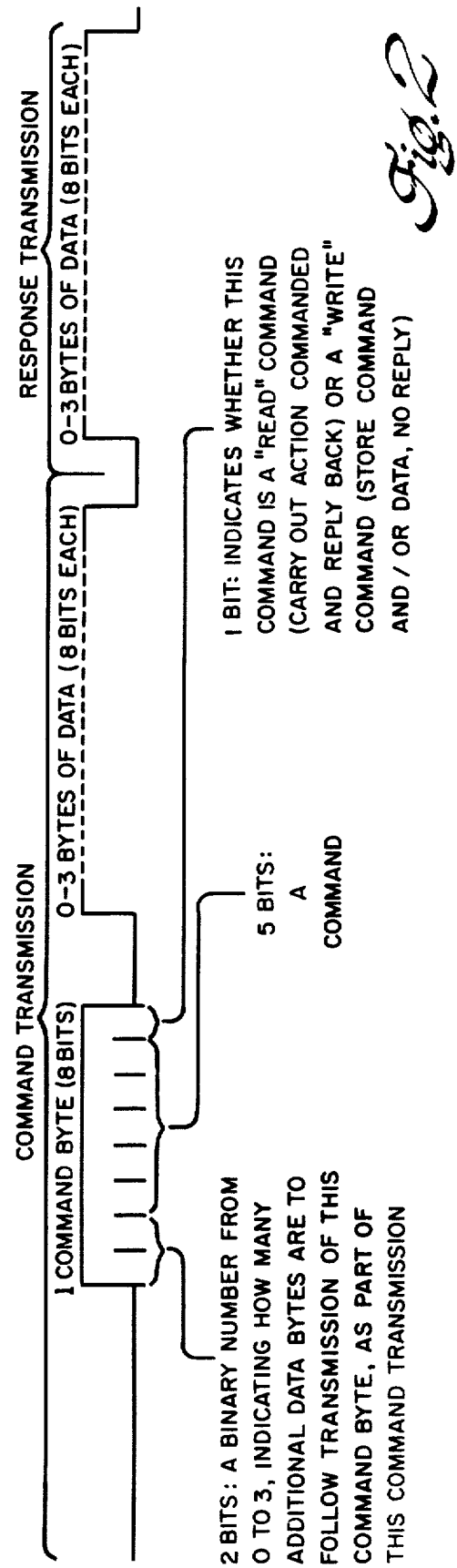

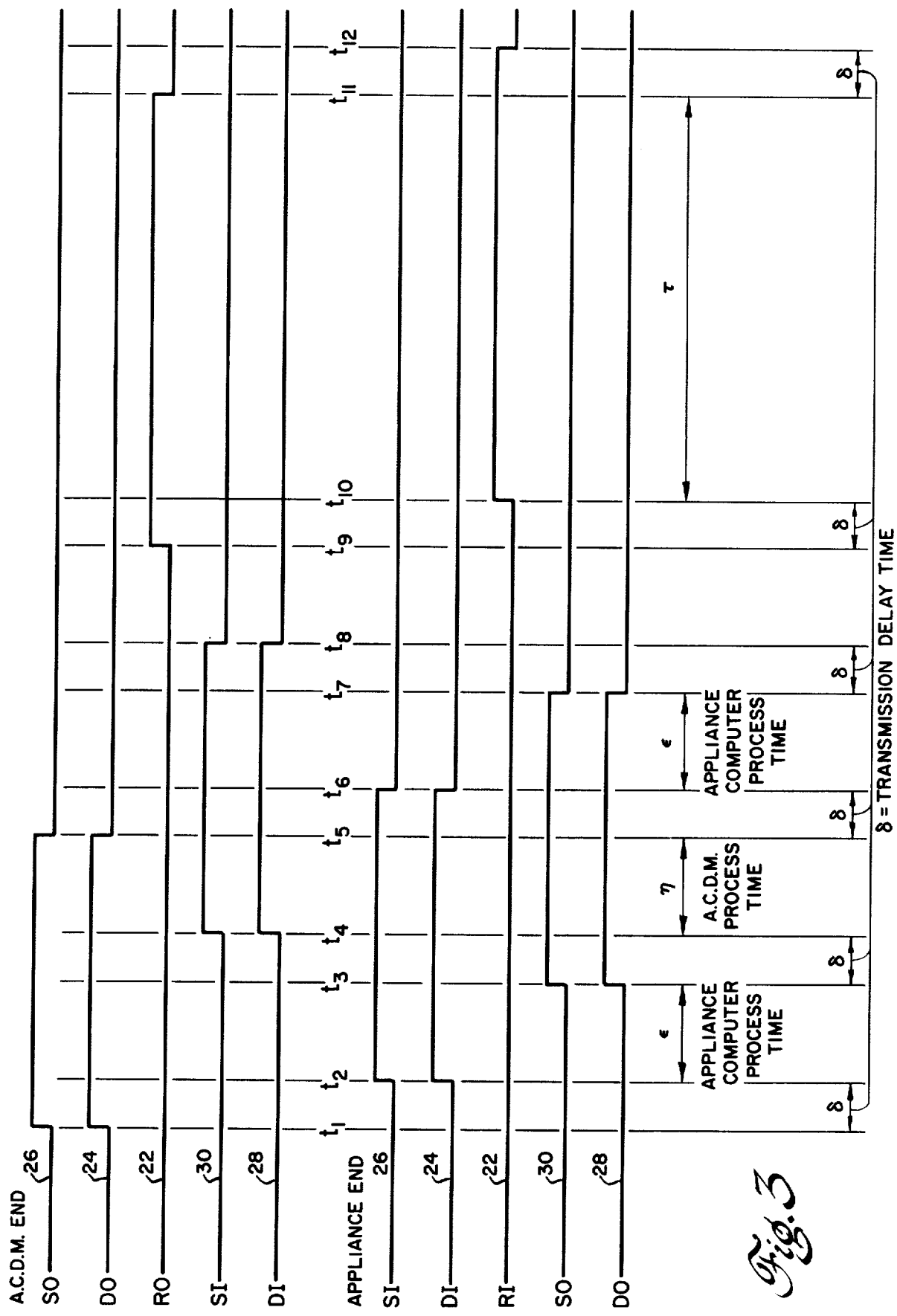

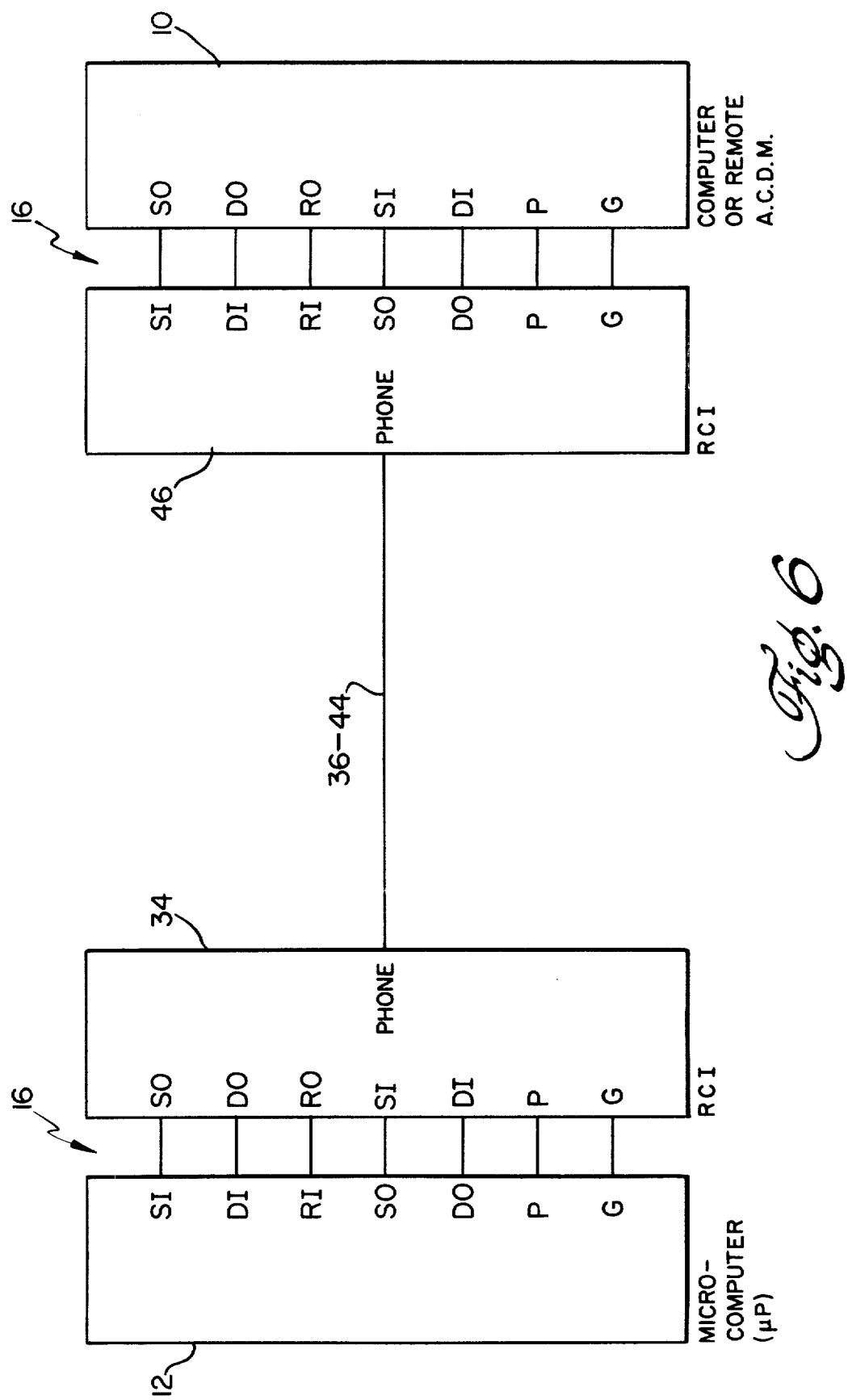

METHOD OF INTERFACING REMOTE UNITS TO A CENTRAL MICROPROCESSOR

BACKGROUND OF THE INVENTION

The present application relates generally to methods of interfacing remote units with a central computer, and more particularly to methods of interfacing remote units with a central microprocessor in a home appliance.

It is becoming increasingly common for microprocessors to be used in electric ranges, microwave ovens, and other home appliances. Since microprocessors malfunction from time to time, it is necessary to have an inexpensive and simple means for diagnosing problems arising in them. One means of doing so would be to provide extensive diagnostic circuits in the microprocessor itself. These circuits would continuously or periodically check the operation of the microprocessor and signal the user when a malfunction was discovered. The inclusion of such a large number of diagnostic circuits, however, would significantly increase the cost of the appliance.

It is accordingly preferred to minimize the number of diagnostic circuits in the appliance itself and to provide a separate hand-held module containing all of the necessary diagnostic circuits for the appliance manufacturer's field service representative to examine the appliance and determine the problem.

To date, hand-held diagnostic modules have been complex and expensive, at least in part because of the problems of interfacing them with the microprocessor in the appliance.

In addition, a manufacturer often desires to modify the capabilities of a home appliance. Modification of the appliance's circuitry, however, is quite expensive. It is preferable to add the new circuitry in a separate module that can be simply attached to the original circuitry without modifying the latter. A simple and economical solution of the interfacing problem could be advantageously applied as well to this problem.

SUMMARY OF THE INVENTION

It is accordingly the principle object of the present invention to provide a simple and inexpensive method of interfacing a hand-held diagnostic unit with a microprocessor in a home appliance.

It is a further object of the present invention to provide a method by which a field service representative of the manufacturer of a home appliance can connect the appliance's microcomputer to a centrally located diagnostic computer via a telephone line for diagnostic work too complex for the field representative to do.

It is another object of the present invention to provide a method of conveniently and easily testing the electronics of an appliance during manufacture.

It is yet another object of the present invention to provide a simple method by which new functions developed for the microprocessor of a home appliance can be tested.

It is a further object of the present invention to provide a simple and inexpensive method of adding a computer module containing a new function to the microprocessor of a home appliance.

In order to achieve the foregoing and other objects of the present invention, all communication between the remote unit and the microcomputer is carried out in accordance with the following handshaking routine. All communication is initiated by the remote unit which contains two output and two input ports. The two output ports are strobe and data outputs SO and DO, respectively. The two input ports are strobe and data inputs SI and DI, respectively. When the remote unit wishes initiate a communication between itself and the microcomputer, it generates a STROBE signal on its strobe output SO and simultaneously places a DATA signal, indicative of the logic level of the data bit to be transmitted to the microcomputer, on its data output DO. The strobe and data output signals generated by the remote unit are applied to strobe and data inputs SI and DI respectively, of the microcomputer via respective transmission lines. The STROBE and DATA signals are maintained on the strobe and data outputs of the remote unit until after it has received an acknowledgment signal from the microcomputer indicating that the microcomputer has received the transmitted information. The microcomputer acknowledges receipt of the transmitted information by generating a STROBE signal on its strobe output SO and by placing a first bit of the data which it is to send to the remote unit on its data output DO. These signals are transmitted to the remote unit by respective transmission lines and are received in the strobe and data inputs SI and DI, respectively, of the remote unit. The remote unit acknowledges receipt of these signals by removing the STROBE signal from its strobe output and returning its data output to a predetermined neutral level. The microcomputer then acknowledges recognition of this change by removing the STROBE signal from its strobe output SO and also placing its data output DO at a predetermined neutral level. When the remote unit recognizes this action by the microcomputer, the transfer of a single bit of information between the remote unit and the microcomputer is complete. At this point, the remote unit initiates the transmission of another bit of data using the same handshaking routine.

BRIEF DESCRIPTION OF THE FIGURES

These and other features and advantages of the present invention will become clearer upon consideration of the following detailed description, taken in conjunction with the Figures, in which like elements are referred to by like reference numerals.

FIG. 1 is a diagram of the interface of the present invention showing its relation to the auxiliary control and diagnostic module (ACDM) and the microcomputer to which it connects;

FIG. 2 is a schematic diagram of one format that can be used conveniently for communicating via the interfacing method of the invention;

FIG. 3 is a timing chart of a handshaking routine for use with the interface of FIG. 1;

FIG. 6 is a schematic diagram illustrating the interface between a pair of remote communication interfaces and the microcomputer and ACDM of the telephone like hookup of FIG. 3.

DETAILED DESCRIPTION OF THE INVENTION

Figure 4:
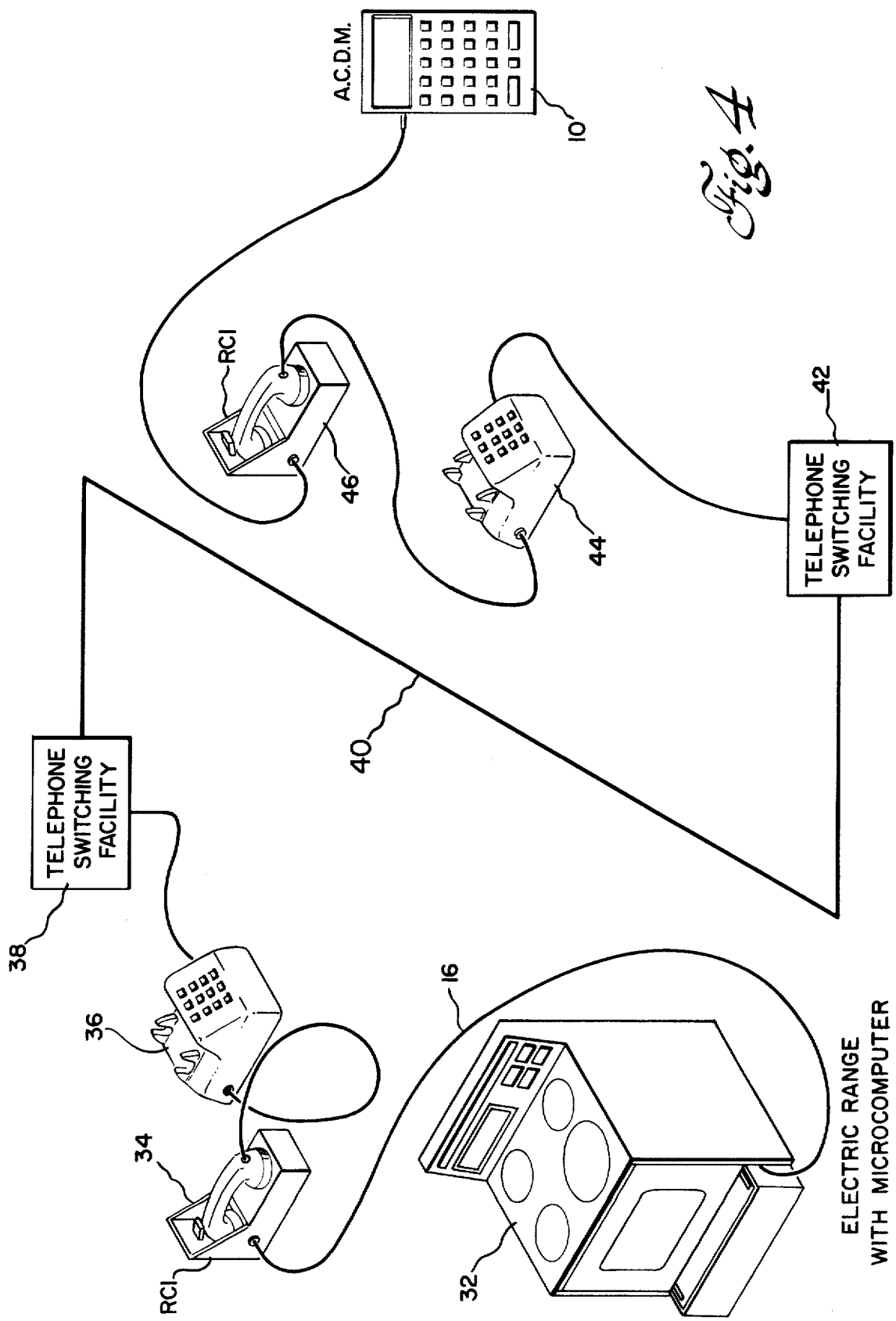
FIG. 4 is a schematic diagram of a telephone line hook-up between an appliance microcomputer and a centrally located ACDM in a regional service center.

FIG. 1 illustrates the manner in which a remote auxiliary control and diagnostic module (hereinafter ACDM) 10 communicates with a microcomputer 12 housed in, and controlling the operation of, an appliance 14 via the interface 16 of the present invention. A first line 18 of the interface 16 is a power line supplying e.g. 5 volts D.C. from the appliance to the ACDM 10. Another line 20 is ground. A third line 22 is a computer reset line by which the ACDM can transmit a signal which resets the appliance microcomputer 12 to a known state as may be necessary to reinitialize appliance 14 after a malfunction. The remaining four lines include data lines 24 and 28 and strobe lines 26 and 30 and are used for transmission of data and commands words between ACDM 10 and microcomputer 12.

Each of the five signal lines 22, 24, 26, 28 and 30 of the interface 16 may include an open-collector inverter 32 at each end of the line. This improves the noise immunity of the system and may permit one or more additional remote units 10 to be interfaced (in wired-OR fashion) with the appliance microcomputer 12 over the same wires. Each end of each of the inverters 32 adjacent an inut into ACDM 10 or microcomputer 12 is connected across a small pull-up resistor 34 to a 5 volt source. As a result of this arrangement, a relatively high-voltage signal (e.g., 5 volts) output by the ACDM 10 or the microcomputer 12 is converted to a low-voltage signal upon entering the wiring of the interface 16 and reinverted to its original voltage on leaving the interface 16.

As shown in FIG. 1, ACDM 10 includes a reset output terminal RO, a data output terminal DO and a strobe output terminal SO. Whenever ACDM 10 wishes to reset the microcomputer 12, it generates a reset out signal (for example, a logic 1) on its reset output terminal RO. This signal is applied to the reset input RI of microprocessor 12 via line 22. Whenever ACDM 10 wishes to transmit data to microcomputer 12, it generates a STROBE signal (for example a binary "1") on its strobe out output SO and simultaneously generates a DATA signal (i.e., either a logic 1 or a logic 0, on its data out output DO. The STROBE signal placed on the strobe output SO of ACDM 10 is applied to the strobe input SI of microcomputer 12 via line 26. Similarly, the DATA signal appearing on the data output DO of ACDM 10 is applied to microcomputer 12 via line 24.

Microcomputer 12 also includes data and strobe output terminals DO and SO respectively. Whenever microcomputer 12 wishes to transmit data to ACDM 10, it generates a STROBE output signal (for example a logic 1) on its strobe output SO and places a DATA signal representative of the first bit of data to be transmitted to ACDM 10 (i.e., a logic 0 or a logic 1) on its data output DO. The information the strobe and data outputs SO and DO of microcomputer 12 are applied to the strobe in and data inputs SI and DI, respectively, of ACDM 10 via lines 30 and 28, respectively.

Each communication is initiated by the ACDM 10, which commands the microcomputer 12 to either stand by to receive information or to send information. All command information from the ACDM 10 to the microcomputer 12 includes a command byte followed by from zero to three data bytes. This preferred format is illustrated in FIG. 2. As shown in FIG. 2, the command byte may include, for example, a two-bit binary number indicating how many data bytes will follow the command byte (i.e., zero to three data bytes); a five-bit command; and a final bit which indicates whether the ACDM 10 will only transmit information to the microcomputer for implementation or storage (a "WRITE" command) or whether the microcomputer 12 is to carry out the action requested by the command and transmit information back to the ACDM 10 (a "READ" command, with a 0-3 byte response transmission). Each of the data bytes preferably includes eight bits of information; however, any other data word size may be used.

Each individual bit of the command and data bytes is transmitted in accordance with the following handshaking routine. This routine is repeated for each individual bit. When ACDM 10 is to transmit, it outputs a STROBE signal (hereinafter a logic 1, although inverse logic could be used) on its strobe output SO and at the same time places the first bit of a data or command byte on data output DO. These signals are applied to its strobe and data inputs SI and DI respectively. Microcomputer 12 is programmed to read the incoming data bit when it detects the logic 1 on strobe line 26. Microcomputer 12 then acknowledges receipt of the STROBE signal from ACDM 10 by generating a STROBE signal (hereinafter a logic 1, although inverse logic could be used) on its strobe output SO and simultaneously outputting the first bit of a data byte (this will be a random bit, however, if the ACDM 10 has not ordered the microcomputer 12 to transmit information to it, as will be explained below) on its data output DO. These signals are applied to the strobe and data inputs of ACDM 10 via strobe and data lines 30 and 28, respectively. ACDM detects the logic 1 on strobe line 30 and reads the incoming data bit on line 28. It then sets both its data and strobe outputs DO and SO, respectively, to the logic 0 level (generally to a predetermined neutral logic level opposite that of the STROBE signal) and remains in that state until microcomputer 12 acknowledges this action by generating logic 0's (generally a predetermined neutral logic level opposite to that of the respectively. At this point, communication of a single bit of information between ACDM 10 and microcomputer 12 has been completed. This handshaking routine is repeated for each bit until all of the bits of the command byte have been sent and is thereafter repeated for each bit of the data bytes of the command transmission.

As noted above, each portion of the communication includes transmission of a bit of a data byte or of a command byte by the ACDM 10 to the microcomputer 12 and the return transmission by the microcomputer 12 of another data bit. When the ACDM 10 is transmitting a command byte, or a data byte containing information to be stored or manipulated by the microcomputer 23, the data bits transmitted by the microcomputer 12 to the ACDM 10 are randomly chosen and are void of any real significance. When the command byte transmitted by the ACDM 10 is one ordering the microcomputer 12 to transmit certain information to the ACDM 10, as by the presence of a bit indicating a "READ" command in the eighth bit of a command byte; then the data bytes transmitted by the ACDM 10 following the command byte (as part of the same communication) will be composed of random bits, and the microcomputer returns bits of data during the bytes of its response (the response transmission).

The operation of the handshake routine described above is shown in the timing diagram of FIG. 3. The upper portion of FIG. 3 shows the ACDM end of the five signal lines 22, 24, 25, 28 and 30. The lower portion of FIG. 3 illustrates the signals applied to and received from lines 24, 26, 28 and 30 by microcomputer 12.

The transmission of a bit begins at time t1 when the ACDM 10 generates a STROBE signal by raising the level of strobe out line 26 to logic 1 and generates a DATA signal by setting data out line 24 to the logic state representing the bit to be transmitted (shown here as a logic 1). After a short time δ (the time required for the signal to be transmitted along the interface lines), the microcomputer 12 receives the STROBE and DATA signals on its strobe and data inputs SI, DI, respectively, at time t2. At time t3, after a further time delay ε required by microcomputer 12 to process the incoming information, microcomputer 12 sets strobe out line 30 to a logic 1 to acknowledge receipt of the transmission of the STROBE and DATA signals from ACDM 10 and outputs a DATA signal on data out line 28 (shown here as a logic 1 like the incoming data pulse, although, as explained above, the incoming and the outgoing data signals need not, and generally do not, contain the same information). These signals are received by the ACDM 10 after another time delay δ, at time t4. After a further time delay required for ACDM 10 to process the incoming signals. ACDM 10 sets strobe out and data out lines 26 and 24 to the neutral level (a logic 0 level) at time t5. After another transmission time delay δ, the reversion of the signals on strobe and data lines 26 and 24 is noted by microcomputer 12 at time t6. After yet another time delay ε for processing, microcomputer 12 sets both of its data and strobe outputs DO and SO to the neutral level (a logic 0 state), at time t7. This last fact is noted by ACDM 10 at time t8, completing the transmission of the bit.

In the event that the transmission is not completed successfully, e.g. if microcomputer 12 does not acknowledge the ACDM's transmission within a predetermined time, ACDM 10 may desire to RESET microcomputer 12 as might occur if initialization of microcomputer 12 were required, say in the event of malfunction. This is accomplished by ACDM 10 applying a logic one level to RESET out RO (line 22) for a period τ, at time t9 as shown in FIG. 3. The period τ is set to be sufficient by long for initialization to occur in microcomputer 12. The reset signal is received at microcomputer 12 on the reset input RI (line 22) at time t10, after the transmission After time τ, at time t11, ACDM removes the RESET by setting RO (line 22) to the logic zero. The logic zero then occurs at reset input RI (line 22), after a transmission delay δ, at time t12. At this time, the RESET sequence is completed and communication can commence at the beginning of a communication cycle.

If other devices in addition to ACDM 10 are connected to microcomputer 12 via the same interface 16, it is necessary to have a method to determine which of several devices attempting to transmit simultaneously is to be allowed to communicate with microcomputer 12 first and which must wait. According to the present invention, this kind of conflict can be resolved by means of a system of signals provided by the appliance during the periods between active transmissions.

When it is not receiving a communication, microcomputer 12 leaves its strobe output SO at a neutral level, herein logic 0 by way of example, and alternates the state of its data out output DO every 1/30th of a second. Before beginning a transmission, each remote device checks lines 28 and 30. The remote devices are only permitted to begin a communication when strobe line 30 shows a logic 0 and data line 28 a logic 1 (such a condition will only occur when the microcomputer 12 is not communicating with another remote device). Once the remote device determines that strobe line 30 shows a logic 0 and that data line 28 shows a logic 1, it raises its strobe output to the logic 1 level and places the appropriate data information on its data output. Microcomputer 12 then echoes these signals on its strobe and data outputs, respectively. The remote device checks lines 28 and 30 to determine if the information contained thereon is identical to the information contained thereon is identical to the information it had transmitted on its own strobe and data lines. If the information is identical, the remote device knows that it is communicating with microcomputer 12 and continues communication in the normal manner. If, on the other hand, the information on lines 28 and 30 is not identical to the information the remote device has generated, the remote device knows that the micromputer has started communicating with another device and waits until the microcomputer again detects a logic 0 on line 30 and a logic 1 on line 18. This process is then repeated.

The remote devices can, if desired, be divided into two groups having different priorities, priority A and priority B. The A priority devices can transmit only after they have received, for example, logic 0's on both strobe line 30 and data line 28 followed immediately by a logic 0 on strobe line 30 and logic 1 on data line 28. Devices of priority B must wait until they receive a logic 0 on strobe line 30 and a logic 1 on data line 28 followed immediately by a logic 0 on both incoming lines 28 and 30.

The time necessary for remote units to begin a transmission to microcomputer 12 and to receive acknowledgment is much less than 1/30th of a second. As a result, a remote unit, beginning a transmission immediately upon detecting the correct sequence of logic states on its strobe and data inputs, can be sure that no remote unit of the opposite priority group will begin transmitting for at least another 1/30th of a second, during which time the remote device will be able to begin its transmission and receive acknowledgement thereof by the microcomputer 12.

The functioning of the microcomputers found in home and other appliances is complicated and a full understanding of such operation requires great expertise. In order to avoid the necessity of extremely extensive training for its service representatives, the appliance manufacturer may prefer to have only a few, centrally-located representatives who are expert in troubleshooting a given type of appliance. Less highly trained field representatives would inspect the malfunctioning appliance and communicate any difficulties they cannot diagnose to the expert by telephone. Such an approach can be made more practical, and the electronic complexity and cost of the diagnostic circuits of the ACDM used by the field representative can be reduced, by means of establishing a direct telephone link between the microcomputer of the malfunctioning appliance and a relatively large computer with a complete set of diagnostic functions at the central location. It is well known in the prior art to transmit computer information over conventional telephone lines by means of acoustic couplers. The interface method of the present invention can be used advantageously to connect the appliance microcomputer to such a coupler, permitting direct communication between the microcomputer and a centrally located computer or other diagnostic device. A schematic view of such an arrangement is shown in FIG. 4.

FIG. 4 shows a home appliance, for example an electric range 32, equipped with a microcomputer and connected to a remote communication interface (RCI) 34 via the interface 16 of the invention. The acoustic output of RCI 34 is fed into the microphone of telephone receiver 36, from which it is conducted through a local telephone switching facility 38, over telephone lines 40, through another switching facility 42, to a telephone receiver 44 at the central service location of the manufacturer of the range. The tones emitted by the receiver 44 are converted by a second RCI 46 to signals for an ACDM 10 (or, alternatively, to a full-size diagnostic computer) used by an expert service representative of the range manufacturer. This link-up can carry information in either direction between the ACDM 10 and the microcomputer in the range 32. By means of this arrangement, an expert at the central service location can diagnose a problem, in the microcomputer, too difficult for the field service representative visiting the owner's home.

Figure 5:
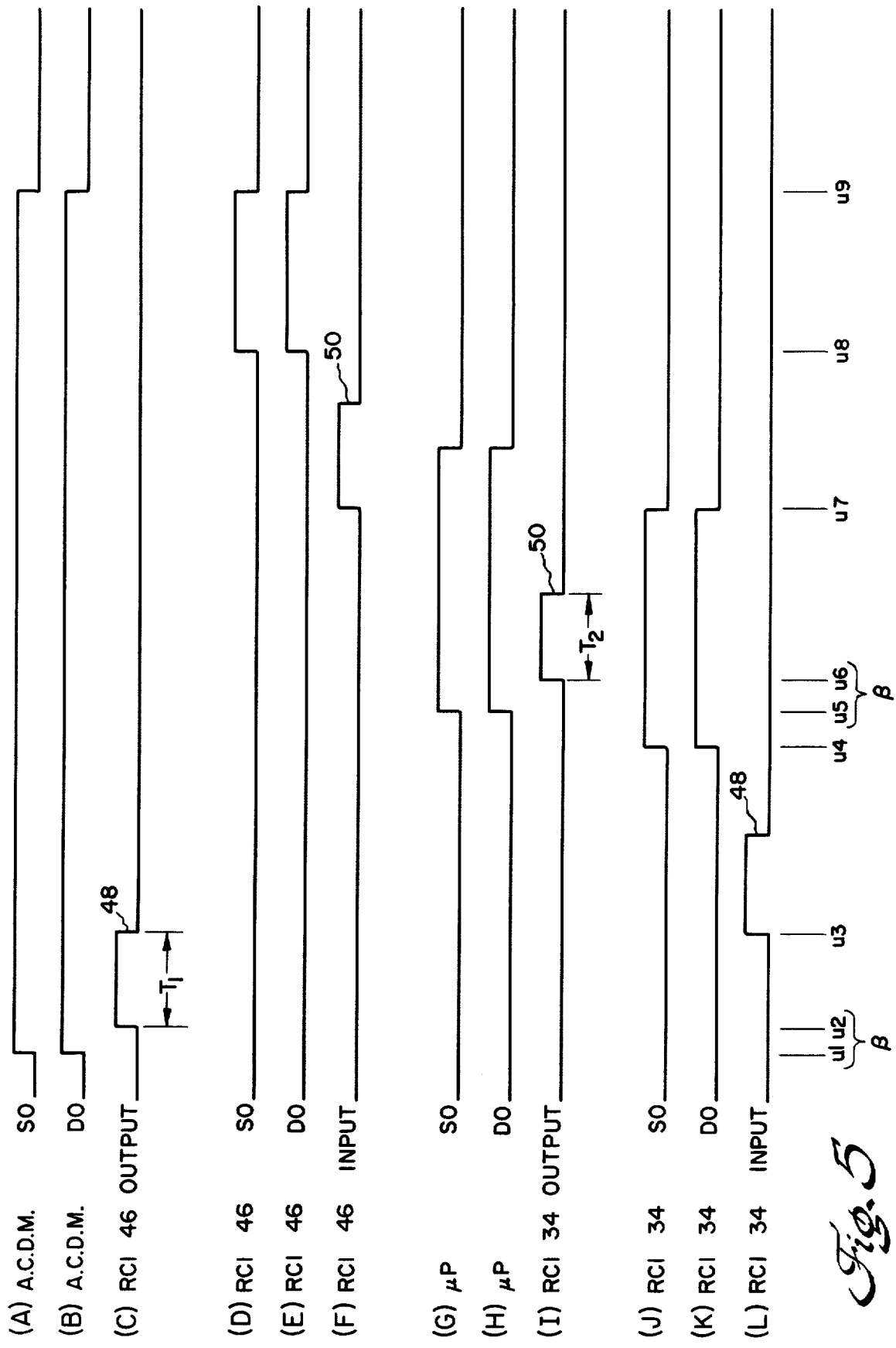
FIG. 5 is a timing chart of the handshaking routine of FIG. 3 adapted for use in conjunction with an acoustic telephone-line coupler as shown in FIG. 4.

FIG. 5 is a timing diagram showing the application of a handshake routine of the interfacing method of the present invention to a telephone hook-up between a centrally located ACDM 10 and the microcomputer 12 of an appliance in the field. FIG. 6 is a simplified block diagram of FIG. 4 which better illustrates the interfacing between the microcomputer 12 o range 32 and its associated RCI 34 as well as the interfacing between the remote ACDM 10 and its associated RCI 46. As shown therein, each interface 16 is identical to the interface 16 of FIG. 1 (the inverters 32 and pull-up resistors 34 having been omitted for simplicity). The manner in which information is transmitted between the computer 10 and the microcomputer 12 may best be understood with reference to FIG. 5.

At time u1 (see FIG. 5A), ACDM 10 generates a STROBE signal by placing its strobe output SO at a logic 1 level and generates a DATA signal by setting its data output DO at a logic level representative of one bit of a command or datum it desires to send to the microcomputer 12 of the appliance 32 (see FIG. 5B), initiating transmission of a data or command byte. ACDM 10 maintains its strobe and data outputs at these levels until after it has received acknowledgment from the microcomputer 12 indicating that the microcomputer 12 has received these signals. After a short processing time period $\beta$, RCI 46 transforms the data or command bit into a tone pulse 48 (see FIG. 5C) on its PHONE output. The length $T_1$ of the tone pulse 48 denotes the logic state of the data bit appearing at the data output DO of computer 10.

Tone pulse 48 is transmitted over the telephone system comprising elements 36 through 44 and is received by the PHONE input of RCI 34 at time u3. See FIG. 5L. In response to the receipt of this signal, RCI 34 generates a STROBE signal (a logic 1) on its strobe output SO at a time u4. See FIG. 5J. Simultaneously RCI 34 generates a DATA signal on its data output DO which is equal to the logic level indicated by the tone pulse 48. See FIG. 5K.

In response to the receipt of signals, microcomputer 12 generates a logic 1 on its strobe output SO and a logic level on its data output DO which is indicative of the level of the data bit to be forwarded to computer 10. See FIGS. 5G and 5H. These signals are received by the strobe and small processing time $\beta$, generates a tone pulse 50 on its PHONE output at time u6. The length $T_2$ of the tone pulse 0 is indicative of the logic level of the DATA signal applied to the data input DI of RCI 34 by microcomputer 12. The tone signal is transmitted over the telephone system comprising elements 36 through 44 and is received by RCI 46 at time u7. See FIG. 5F. In response to the receipt of tone pulse 50, RCI 46 places a STROBE signal (a logic 1) on its strobe output SO and places a logic level on its data output (a logic 1 in the example shown) corresponding to the logic level of the tone pulse 50. See FIGS. 5D and 5E. Finally, at time u9, after ACDM 10 has received the STROBE and DATA signals appearing at the strobe and data outputs SO and DO, respectively, of RCI 46, it returns both its strobe and data outputs SO and DO, respectively, to the logic 0 level. See FIGS. 5A and 5B. When RCI 36 detects the ACDM SO line going to zero, RCI 46 places a logic 0 level on both its SO and DO lines (see FIGS. 5D and 5E). Likewise, when RCI 34 detects that computer 12 has sent its data, RCI 34 lowers its SO and DO lines, as shown in FIGS. 5J and 5K, at time u7. Microcomputer 12 acknowledges by lowering its SO and DO lines. See FIGS. 5G and 5H.

Computer 10 may wish to send a RESET signal to microcomputer 12 in order to initialize microcomputer 12 or recover from a malfunction. Computer 10 starts the RESET process by generating a RESET signal (preferably a logic level 1) on its reset output RO. This signal is received by RCI 46 which generates a very long tone pulse (for example a tone which is present for over 100 cycles) over the telephone network 36 through 44. This pulse is received by the PHONE input of CRI 34 which generates a RESET signal on its reset output RO responsive thereto. This RESET signal is received by the reset input RI of microcomputer 12 thereby resetting the microcomputer 12.

Another possible application of the interface of the present invention is to appliance feature extension modules. As noted above, it is desirable to be able to improve or to extend the capabilities of an appliance microcomputer without the necessity of replacing or rewiring a large part of its original circuitry. To this end, a new feature for an appliance microcomputer may be added by simply plugging in a new circuit board, containing a separate microcomputer and a communication interface, and having this new circuit board communicate with the primary microcomputer already in the appliance. The new circuit board can simply be attached directly to the original microcomputer of the appliance, without any need to make any changes in the original circuitry. The simplicity and low cost of the interface of the present invention make it particularly suitable for this application. In particular, it is possible for the manufacturer to introduce small changes in the appliance design from year to year without any change in the majority of the production line.

As used in the appended claims the terminology STROBE 1 and DATA 1 indicate the STROBE and DATA signals generated by ACDM 10 and forwarded to microcomputer 12 over strobe and data lines 26 and 24, respectively, while the terminology STROBE 2 and DATA 2 indicates the STROBE and DATA signals generated by microcomputer 12 and forwarded to ACDM 10 over strobe and data lines 30 and 28, respectively.

Although one preferred embodiment of the interface of the present invention has been described in detail herein, many modifications and variations thereof will now be apparent to those skilled in the art, and accordingly, the scope of the invention is to be limited not by the details of the above description but only by the terms of the appended claims.

What is claimed is:

1. A method for transmitting N bits of binary information between a first electronic unit over a first transmission interface, a telecommunications line, and a second transmission interface, to a second electronic unit, in accordance with a handshaking routine, N being a positive integer, and said first and second transmission interfaces each comprising a respective set of four lines, said handshaking routine comprising the steps of:
   (a) simultaneously transmitting a first strobe signal STROBE 1 and a first data signal DATA 1, respectively, on first and second ones of said four lines of said first transmission interface;
   (b) transmitting the information contained in said first data signal DATA 1 over said telecommunications line in the form of a first frequency signal;
   (c) converting in said second transmission interface said first frequency signal into a second strobe signal STROBE 2 and a second data signal DATA 2, said second data signal DATA 2 containing the same information as said first data signal DATA 1;
   (d) simultaneously transmitting said second strobe and data signals STROBE 2 and DATA 2, respectively, over first and second ones of said four lines of said second transmission interface to said second electronic unit;
   (e) simultaneously transmitting from said second electronic unit a third strobe signal STROBE 3 and a third data signal DATA 3 on third and fourth ones of said four lines of said second transmission interface, respectively, information differing from the information contained in said DATA 2 signal;
   (f) transmitting the information contained in said DATA 3 signal over said telecommunications line in the form of a second frequency signal;
   (g) converting in said first transmission interface said second frequency signal into a fourth strobe signal STROBE 4 and a fourth data signal DATA 4, said fourth data signal DATA 4 containing the same information as said third data signal DATA 3;
   (h) simultaneously transmitting said fourth strobe and data signals to said first remote electronic unit, respectively, over third and fourth lines of said first transmission interface to said first electronic unit;
   (i) terminating transmission of said first strobe and data signals when said first electronic unit receives said fourth strobe and data signals; and
   (j) terminating transmission of said strobe and data signals generated by said second electronic unit when said second electronic unit receives the termination of said first strobe and data signals.

2. The method of claim 1, wherein each of said first and second frequency signals transmitted over said telecommunications line is a tone pulse the duration of which denotes the information contained in the respective one of said data signals converted into said tone pulse.

3. The method of claim 1, wherein only one of said DATA 1 and DATA 3 signals contains relevant information during any given repetition of said handshaking routine.

4. The method of claim 1, wherein each of said two transmission interfaces includes a respective fifth transmission line and wherein said electronic unit transmits a RESET signal over said fifth transmission lines to said second electronic unit whenever said second electronic unit is to be initialized.

5. The method of claim 4, wherein said first electronic unit reinitiates transmission of said N bits of binary information after the transmission of said RESET signal.

6. The method of claim 5, wherein said N bits of binary information include an initial eight bits followed by from zero to three blocks of data bits, said initial eight bits including: two bits that constitute a binary number from zero to three denoting the number of data blocks following said eight bits; five bits following said two bits and consituting a command word; and one bit following said five bits, said one bit signifying whether relevant information is to be transferred from said first unit to said second unit or from said second unit to said first unit.

7. A method of transferring M bits of binary information from a first electronic unit to a second electronic unit and N bits of binary information from a third electronic unit to said second electronic unit over a transmission interface including four lines, in accordance with a predetermined handshaking routine, M and N being positive integers, and said handshaking routine comprising the steps of:
   (a) simultaneously transmitting from said first electronic unit to said second electronic unit a first strobe signal STROBE 1 and a first data signal DATA 1 on first and second lines of said transmission interface, respectively, at a time when the third and fourth of said four lines of said transmission interface carry signals of first and second predetermined levels, respectively;
   (b) when said second electronic unit receives said first strobe and data signals STROBE 1 and DATA 1, simultaneously transmitting from said second electronic unit to said first electronic unit a second strobe signal STROBE 2 and a second data signal DATA 2 on said third and fourth lines of said transmission interface, respectively, with the information contained in said second data signal DATA 2 being the same as that contained in said first data signal DATA 1 if said second electronic unit is not communicating with an electronic unit other than said first unit;
   (c) when said second strobe and data signals are detected by said first electronic unit, terminating transmission of said first strobe and data signals STROBE 1 and DATA 1;
   (d) when said second electronic unit detects the cessation of said first strobe and data signals STROBE 1 and DATA 1, terminating transmission of said second strobe and data signals STROBE 2 and DATA 2;
   (e) simultaneously transmitting from said third electronic unit to said second electronic unit a third strobe signal STROBE 3 and a third data signal DATA 3 over said first and second lines, respectively, of said transmission interface, said transmission being performed at a time when said third and fourth lines of said interface respectively carry signals of third and fourth predetermined levels, respectively;
   (f) when said second electronic unit receives said third strobe and data signals STROBE 3 and DATA 3, simultaneously transmitting from said second electronic unit to said third electronic unit a fourth strobe signal STROBE 4 and a fourth data signal DATA 4 on said third and fourth lines of said interface, respectively, the information contained by said fourth data signal DATA 4 being the same as that contained by said third data signal DATA 3 if said second electronic unit is not communicating with an electronic unit other than said third electronic unit;

(g) when said fourth strobe and data signals are detected by said third electronic unit, terminating transmission of said third strobe and data signals STROBE 3 and DATA 3; and (h) when said second electronic unit detects the cessation of said third strobe and data signals STROBE 3 and DATA 3, terminating transmission of said fourth strobe and data signals STROBE 4 and DATA 4.

8. The method of claim 7, wherein said first and third predetermined levels are the same.

9. The method of claim 8, wherein said second electronic unit, when it is not communicating with another electronic unit, applies a signal of said first predetermined level to said third line of said interface and periodically alternates between applying a signal of said second predetermined level and applying said interface.

10. The method of claim 7, wherein only one of said DATA 1 and DATA 2 signals, and only one of said DATA 3 and DAT 4 signals, contains relevant information during any one repetition of said handshaking routine.

11. The method of claim 7, wherein said transmission interface further comprises a fifth transmission line and wherein said first electronic unit and said third electronic unit can each, independently of the other, transmit a RESET signal over said fifth line to said second electronic unit whenever it is desired to initialize said second electronic unit.

12. The method of claim 11, wherein said first electronic unit or said third electronic unit reinitiates transmission of said M or N bits of binary information, respectively, after that unit has transmitted said RESET signal.

13. The method of claim 12, wherein said M bits and said N bits of binary information each include an initial eight bits and each further include a respective number from zero to three of blocks of data bits following said respective initial eight bits, with each initial eight bits including: two bits constituting a respective binary number from zero to three denoting the number of data bit blocks following said respective initial eight bits; five bits following said two bits and constituting a respective command word; and one bit following said five bits, said one bit signifying, respectively, whether relevant information is to be transferred from said first electronic unit to said second electronic unit or from said second electronic unit to said first electronic unit and whether relevant information is to be transferred from said third electronic unit to said second electronic unit or from said second electronic unit to said third electronic unit.

* * * * *